(12) United States Patent
Holm

(10) Patent No.: US 10,967,548 B2
(45) Date of Patent: Apr. 6, 2021

(54) METHOD FOR MANUFACTURING A HAND TOOL HANDLE, AND A HAND TOOL HANDLE

(75) Inventor: Carl-Olof Holm, Dragsvik (FI)

(73) Assignee: Fiskars Finland Oy Ab, Helsinki (FI)

( * ) Notice: Subject to any disclaimer, the term of this patent is extended or adjusted under 35 U.S.C. 154(b) by 3177 days.

(21) Appl. No.: 12/962,303

(22) Filed: Dec. 7, 2010

(65) Prior Publication Data
US 2011/0138975 A1 Jun. 16, 2011

(30) Foreign Application Priority Data
Dec. 15, 2009 (FI) .................................... 20096328

(51) Int. Cl.
*B25G 1/01* (2006.01)
*B29C 45/16* (2006.01)
*B29C 45/14* (2006.01)

(52) U.S. Cl.
CPC .... *B29C 45/1676* (2013.01); *B29C 45/14598* (2013.01)

(58) Field of Classification Search
CPC ........ B22D 19/00; B21J 5/00; B22F 2998/00; B29C 33/56; B29C 47/02; B29C 43/18; B29C 45/16; B29C 45/1635; B29C 45/1676; B29C 45/1615; B29C 45/14598; B29C 45/14418; B29C 45/1679; B29C 45/14467; B29C 70/84; B29C 70/745; B29C 45/14; B29C 45/14008; B29C 45/10465; B29C 2045/1454; B29C 45/14491; B29C 45/14524; B29C 45/14622; B29C 45/1671; B29C 39/10; B29K 2021/00; Y10T 29/49984; Y10T 29/49988; A63B 53/04
USPC .......... 29/527.5, 527.2, 527.1; 264/255, 279, 264/267; 81/489
See application file for complete search history.

(56) References Cited

U.S. PATENT DOCUMENTS

| | | |
|---|---|---|
| 107,577 A | 9/1870 | Will |
| 157,610 A | 12/1874 | King |
| 476,459 A | 6/1892 | Hamann et al. |

(Continued)

FOREIGN PATENT DOCUMENTS

| | | |
|---|---|---|
| CN | 2407893 | 11/2000 |
| CN | 1515387 | 7/2004 |

(Continued)

OTHER PUBLICATIONS

Search Report for Finnish Application No. 20096328, dated Jun. 4, 2010, 1 page.

(Continued)

*Primary Examiner* — Hadi Shakeri
(74) *Attorney, Agent, or Firm* — Foley & Lardner LLP

(57) ABSTRACT

The present invention relates to a method for manufacturing a handle for a hand tool, the handle comprising a body portion and a gripping part that is provided at least partly on the body portion and intended for the user to grip when using the hand tool. In the method of the invention there is first fabricated the gripping part and it is set in a mould cavity, whereafter melt mass is cast into the mould cavity to provide the body portion such that the melt mass flows underneath the gripping part, whereby the gripping part is pressed against the wall of the mould cavity.

15 Claims, 3 Drawing Sheets

(56) References Cited

U.S. PATENT DOCUMENTS

| | | | |
|---|---|---|---|
| 573,548 A | 12/1896 | Sours | |
| 640,257 A | 1/1900 | Baer | |
| 823,367 A | 6/1906 | Ryan | |
| 863,111 A | 8/1907 | Smohl | |
| 1,066,675 A | 7/1913 | Stowell | |
| 1,168,125 A | 1/1916 | Stowell | |
| 1,429,792 A | 9/1922 | Stiriss | |
| 1,455,297 A | 5/1923 | Lyons et al. | |
| 1,464,526 A * | 8/1923 | Gutman | B22D 19/00 16/DIG. 30 |
| 1,480,062 A * | 1/1924 | Gutman | B22D 19/00 292/348 |
| 1,502,191 A | 7/1924 | Helwig | |
| 1,689,648 A | 10/1928 | Voleske | |
| 1,760,627 A | 5/1930 | Bernard | |
| 1,897,532 A | 2/1933 | Pilcher | |
| 2,516,946 A | 8/1950 | Barone | |
| 3,256,378 A * | 6/1966 | Hauf | B29C 31/002 264/267 |
| 4,130,938 A | 12/1978 | Uhlmann | |
| 4,261,567 A * | 4/1981 | Uffindell | A63B 53/14 264/45.1 |
| 4,338,270 A * | 7/1982 | Uffindell | A63B 53/14 16/421 |
| 4,599,795 A | 7/1986 | Yokoyama | |
| 4,677,748 A | 7/1987 | Kobayashi | |
| 4,819,939 A | 4/1989 | Kobayashi | |
| 4,935,184 A | 6/1990 | Sorensen | |
| 5,601,003 A * | 2/1997 | Amtenbrink | B25G 1/105 81/177.1 |
| 5,683,647 A * | 11/1997 | Kawasaki | B29C 33/0044 264/259 |
| 5,740,586 A * | 4/1998 | Gomas | B25G 1/10 16/430 |
| 5,964,009 A * | 10/1999 | Hoepfl | B25G 1/105 16/430 |
| 6,345,446 B1 | 2/2002 | Huang | |
| 6,352,485 B1 * | 3/2002 | Philpot | A63B 59/0092 473/564 |
| 6,368,536 B1 * | 4/2002 | Hoepfl | B25G 1/105 264/250 |
| 6,464,920 B1 * | 10/2002 | Kramer | B29C 45/16 15/143.1 |
| 6,749,790 B1 * | 6/2004 | Lieser | B25G 1/105 16/436 |
| 6,821,469 B2 * | 11/2004 | Ashikawa | B29C 45/0055 249/136 |
| 6,829,829 B1 | 12/2004 | Huang | |
| 6,935,031 B1 | 8/2005 | Huang | |
| 6,938,346 B1 | 9/2005 | Huang | |
| 7,127,819 B1 | 10/2006 | Huang | |
| 7,429,348 B2 * | 9/2008 | Soerensen | B25G 1/04 264/328.1 |
| 7,461,474 B1 * | 12/2008 | Lu | G09F 3/20 40/660 |
| 7,530,172 B1 | 5/2009 | Wu | |
| 7,877,843 B2 * | 2/2011 | Holland-Letz | B25G 1/01 16/430 |
| 2001/0005941 A1 | 7/2001 | Dimatteo et al. | |
| 2003/0062654 A1 * | 4/2003 | Lamkin | 264/250 |
| 2003/0127775 A1 * | 7/2003 | McDonald | 264/338 |
| 2003/0135943 A1 * | 7/2003 | Meyer | A46B 5/02 15/143.1 |
| 2004/0036194 A1 * | 2/2004 | Chadwick | B32B 7/02 264/250 |
| 2004/0113312 A1 * | 6/2004 | Strahler | A46B 5/02 264/243 |
| 2004/0224786 A1 * | 11/2004 | Reardon | A63B 53/14 473/300 |
| 2005/0221909 A1 * | 10/2005 | Nam | A63B 53/14 473/300 |
| 2005/0287243 A1 * | 12/2005 | Sekihara et al. | 425/567 |
| 2006/0156554 A1 | 7/2006 | Lin | |
| 2008/0052916 A1 | 3/2008 | Lin | |
| 2008/0155835 A1 | 7/2008 | Lin | |
| 2008/0282549 A1 | 11/2008 | Lin | |
| 2008/0303190 A1 * | 12/2008 | Wachi | 264/328.8 |
| 2010/0043237 A1 | 2/2010 | Linden et al. | |
| 2010/0043238 A1 | 2/2010 | Linden et al. | |
| 2010/0162575 A1 | 7/2010 | Lin | |
| 2010/0199502 A1 | 8/2010 | Linden et al. | |
| 2011/0278769 A1 * | 11/2011 | Ehbing et al. | 264/446 |

FOREIGN PATENT DOCUMENTS

| | | |
|---|---|---|
| CN | 101384413 | 3/2009 |
| EP | 0 747 181 | 12/1996 |
| EP | 1 153 713 | 11/2001 |
| EP | 1 166 620 | 1/2002 |
| EP | 2 156 730 | 2/2010 |
| EP | 2 156 731 | 2/2010 |
| GB | 2 468 665 | 9/2010 |
| JP | 08-331979 | 12/1996 |
| JP | 11-057243 | 3/1999 |
| JP | 2002-066168 | 3/2002 |
| WO | WO-02/06034 A1 | 1/2002 |

OTHER PUBLICATIONS

Chinese Office Action and English Translation for CN Application No. 201010588702.8, dated Mar. 29, 2013, 19 pages.

Extended European Search Report for Patent Application No. EP 10194249, dated Apr. 24, 2014, 5 pages.

* cited by examiner

METHOD FOR MANUFACTURING A HAND TOOL HANDLE, AND A HAND TOOL HANDLE

CROSS REFERENCE TO RELATED APPLICATIONS

The present application claims the benefit of priority of Finnish patent application No. 20096328 titled "Method for Manufacturing Hand Tool Handle, and a Hand Tool Handle" filed on Dec. 15, 2009, the disclosure of which is hereby incorporated by reference in its entirety.

BACKGROUND

The invention relates to a method for manufacturing a handle for a hand tool.

Handles of hand tools are often made of two or more materials, or two or more interconnected portions. These handles generally comprise a rigid body portion and one or more surface portions provided thereon. The body portion is larger in size and of harder material and it constitutes the body of the handle whereto other portions of the hand tool are connected or connectable. The surface portion, in turn, is generally provided on the body portion as a surface layer that covers at least part of the body portion. The surface portion is smaller in size than the body portion and often also of softer material than the body portion. This surface portion may be, for instance, a gripping portion, the purpose of which is to provide a gripping area for the handle that the user grips when the hand tool is used in order for holding the hand tool. A gripping portion of this kind is generally of softer material than the body portion for added comfort in using the hand tool. A friction coefficient of the gripping portion may also be higher than that of the body portion. Alternatively, the surface layer may be a coloured layer or the like, whereby the handle or a portion thereof is provided with a desired colour or colours.

In accordance with prior art, handles of this kind, which consist of two or more materials or two or more portions, are generally manufactured by use of two-component injection moulding, multi-component injection moulding or other multi-component moulding. Generally, in the manufacturing process, there is first moulded a body portion for a handle, which is of harder material and larger in size, in a mould cavity of a first mould. After moulding the body portion, the body portion having solidified, it is transferred to a mould cavity of a second mould, where a surface portion is cast on the body portion. Thus, the difference between the mould cavities of the first and the second moulds is that the mould cavity of the first mould lacks the space required by the surface portion.

The generally known manufacturing process of a handle has a drawback that a body portion, which is large in size, has to be transferred between mouldings from a first mould to a second mould. It is cumbersome to transfer the body portion because of its dimensions and weight, and therefore it demands complicated arrangements. In addition, the importance of distortions occurring in connection with shrinkage and solidification will be emphasized in large pieces, whereby it becomes more difficult to fit the body portion inside the mould cavity of the second mould. To achieve a successful moulding of the surface portion, the mould cavity of the second mould should follow very closely the geometry of the body portion, which is problematic because of said distortions. In other words, said distortions are often impossible to predict, which leads to variations in quality.

SUMMARY

One embodiment of the invention is based on the idea that first is fabricated a handle surface portion that is usually smaller and lighter than the body portion. The surface portion is fabricated, for instance, by injection moulding, and after fabrication it is transferred into a mould cavity of a mould for moulding the body portion. The body portion of the handle may simultaneously constitute a shaft for an axe, a pair of secateurs, a rake or the like garden tool, and consequently a shaft need not be fabricated separately any longer. In other words, in one embodiment of the present invention there is first formed a generally smaller and lighter surface portion, which is thereafter placed in a mould where the body portion is moulded. The surface portion is placed in the mould cavity of the mould advantageously such that it is against a cavity wall. In accordance with the invention, the casting of the body portion is carried out such that melt mass, of which the body portion is formed, is cast into the cavity of the mould such that the melt mass flows under the surface portion pressing simultaneously the surface portion against the wall of the mould cavity. In order to introduce melt mass underneath the surface portion, the surface portion is set against the wall in the mould cavity such that it will not be able to move in the mould cavity by the effect of the propagation of the melt mass.

The method of the present embodiment has an advantage that the larger body portion need not be transferred in the course of the fabrication process, it will suffice that the smaller surface portion is transferred. In that case, transfer of pieces relating to two- or multi-component moulding becomes easier and simpler. In addition, because the surface portion is generally smaller in size than the body portion, the distortions occurring in connection with shrinkage and solidification are smaller in the surface portion than in the body portion. This further reduces variations in the quality of the handle, because it is easier to make the geometry of the surface portion to match the mould cavity.

BRIEF DESCRIPTION OF THE DRAWINGS

In the following, the invention will be described in greater detail in connection with the illustrated embodiments, with reference to the attached drawings, in which.

DETAILED DESCRIPTION

Figure 1:
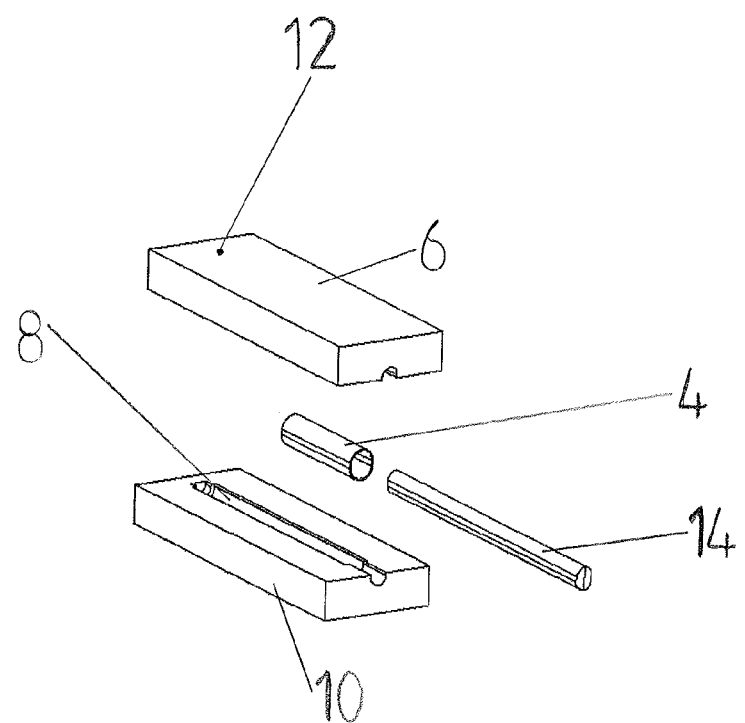
FIG. 1 shows a method step in accordance with one embodiment of the invention, in which a surface portion and a core are set in a mould.

With reference to FIG. 1, it shows a schematic view of one embodiment of the method for manufacturing a handle of the present invention and a first step of the method. In accordance with FIG. 1, a surface portion 4 is fabricated first. The surface portion 4 may be fabricated, for instance, by injection moulding in a separate surface portion mould, or alternatively, by another moulding technique or other manufacturing method. In accordance with FIG. 1, the surface portion 4 may be a sleeve-like or tubular part, a planar part, a strip-like part or any other part that may be provided on the surface of the body portion of the handle. The sleeve-like surface portion 4 is made to surround at least partly the body portion 2 in the finished product. Advantageously, the surface portion 4 is a gripping portion that is intended for the user to grip when the hand tool is in use. The surface portion or the gripping portion 4 is advantageously of softer material than the body portion on which it is provided.

Figure 2A:
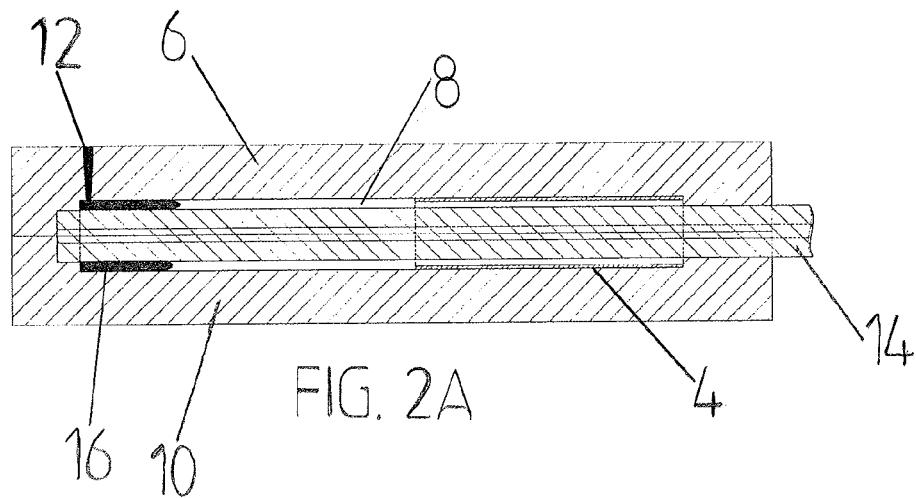
FIGS. 2A, 2B and 2C show a method step for fabricating a body portion.

Referring further to FIG. 1, the finished surface portion 4 is transferred and placed in a mould, which in this embodiment consists of a first mould part 6 and a second mould part 10. The first and the second mould parts 6, 10 comprise a mould impression and form a mould cavity 8 when the first and the second mould parts 6, 10 are set against one another to close the mould. The first mould part 6 is provided with a melt channel 12 for feeding melt mass into the mould cavity. In accordance with FIG. 1 the melt channel 12 is provided at one end of the mould cavity 8. At first, the completed surface portion 4 is set in the mould cavity 8 while the mould is open. The surface portion 4 is set in the mould cavity 8 such that it is unable to move during moulding. In an embodiment the surface portion 4 is set, as shown in FIG. 2A, in the end of the mould cavity that during casting is the downstream end in the flow direction of melt material. In other words, the surface portion 4 is set in the end of the mould cavity 8 that is opposite to the melt channel 12 wherefrom the melt mass is fed into the mould cavity 8. So the surface portion 4 is set in the mould cavity 8 such that the melt flow in fact presses the surface portion 4 closer against the end. In an alternative solution, a recess may be provided in the mould cavity 8, in which recess the surface portion 4 is set such that it will be unable to move. The mould cavity 8 may also be provided with a counterpart surface, against which the surface portion 4 is set such that it will be unable to move by the effect of the melt mass flow. The counterpart surface may be formed, for instance, by means of the shape of the mould cavity wall or even by means of a mould core. The surface portion 4 is also placed in the mould cavity 8 such that it will rest against the wall of the mould cavity 8.

After setting the surface portion 4 in place the mould is closed by setting the mould parts 6, 10 against one another. In accordance with the figure, the manufacturing means also include a mould core 14, which is inserted into the mould cavity 8 after closing the mould so as to fill part of the mould cavity 8. Alternatively, the mould core 14 may be inserted into the mould cavity prior to closing the mould, however, prior to casting. In the embodiment of FIG. 1 the mould core 14 is inserted through an aperture at the end of the closed mould to the mould cavity 8 and further through the sleeve-like surface portion 4, as shown in FIG. 2A. It appears from FIG. 2A that in the mould cavity 8 between the surface portion 4 and the core 14 there is a gap into which the melt mass can flow during casting. The core 14 may be used when a hollow part is moulded, but the core 14 may be omitted when a solid part is moulded.

Figure 2B:
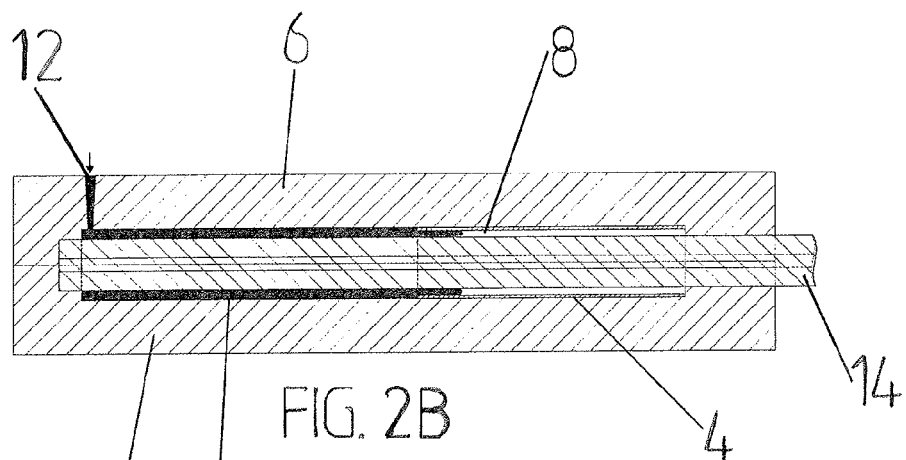
Figure 2C:
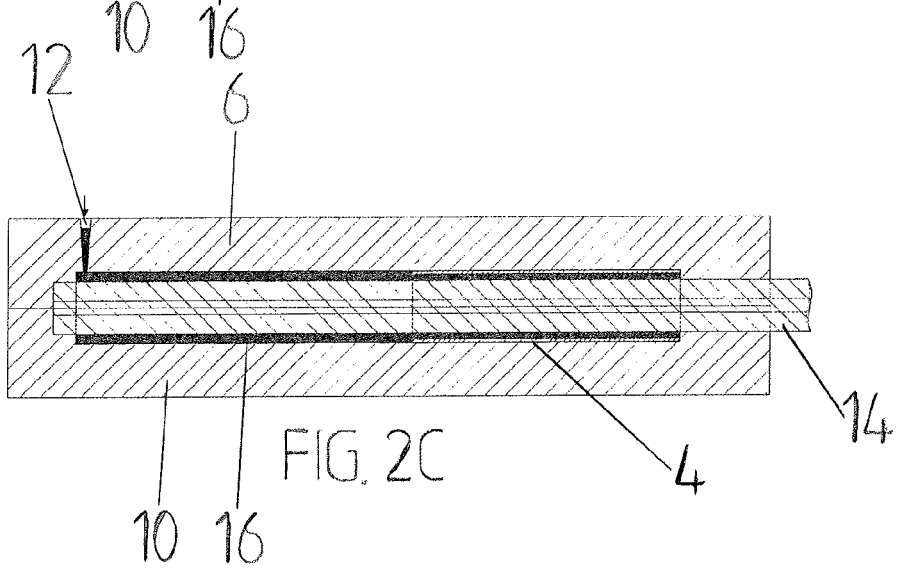

FIGS. 2A, 2B and 2C show one embodiment of how the moulding of the body portion 2 of the handle proceeds. In accordance with FIG. 2A, melt mass 16 starts to be fed into the mould cavity through a melt channel 12 for producing the body portion. In accordance with FIG. 2B, the melt mass 16 propagates in the mould cavity 8 and fills it. The melt mass 16 flows onwards in the mould cavity 8 in a space between the cavity walls and the core 14. When it reaches, as shown in FIG. 2B, the surface portion 4 that is set to be against the wall and immobile at the end of the mould cavity 8, the melt mass 16 flows into the space between the surface portion 4 and the core 14, i.e. beneath the surface portion 4. In the mould cavity the melt mass 16 flows where it has easiest access. In this case it is easier for the melt mass 16 to flow beneath the surface portion 4 than to wedge between the surface portion 4 and the wall of the mould cavity 8. In doing so the melt mass 16 presses the surface portion 4 even closer against the wall of the mould cavity 8. In addition, the front of melt mass 16 propagates such that new mass always enters in the middle of the flow. The melt mass on the outer edge of the flow, which is in contact with the wall of the mould cavity, does not move. Thus, in the region where the melt mass 16 might easily flow between the surface portion 4 and the mould cavity 8, there will be not much motion in the propagation direction of the melt mass 16. As the surface portion 4 is at the end of the mould cavity, as shown in FIG. 2B, the propagation of the melt mass 16 is not able to push it forward. However, the melt mass 16 presses or pushes the surface portion 4 against the wall of the mould cavity 8.

Referring further to the embodiment shown in FIGS. 2A and 2B, the moulding of the handle body portion is carried out by casting melt mass 16 underneath the surface portion 4. In other words, the moulding of the body part is carried out as moulding underneath by means of injection moulding, for instance. In that case the surface portion 4 may be fabricated first and thereafter the body portion. In accordance with the embodiment shown in FIG. 2C, the moulding of the body part is completed, when the mould cavity 8 is filled up. The moulding is allowed to cool down and solidify, whereby the surface portion 4 and the body portion will be bonded to one another forming a two-component structure.

Figure 3:
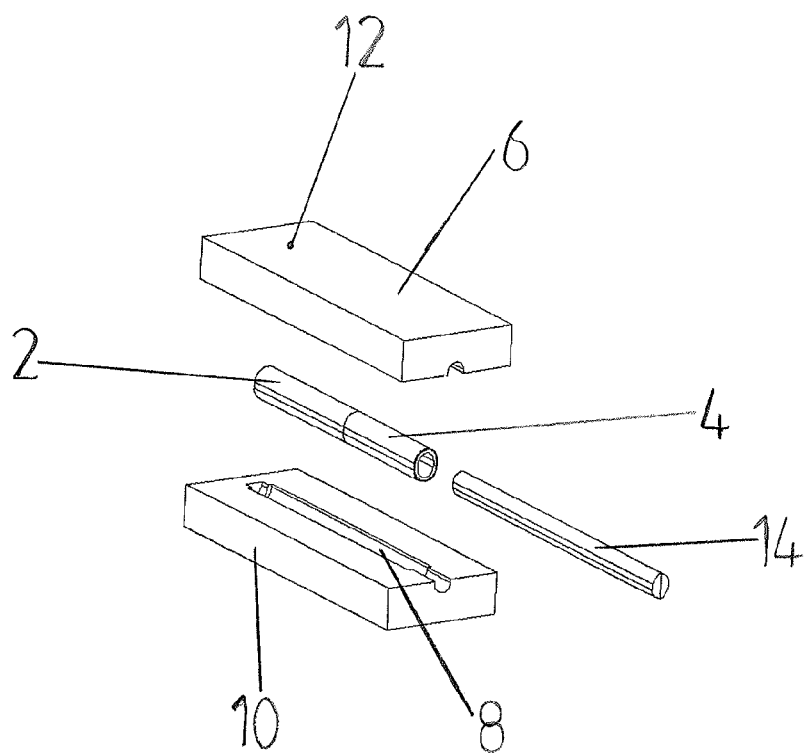
FIG. 3 shows a finished handle and its removal from the mould, according to the illustrated embodiment.

Thereafter the mould is opened by detaching the mould parts 6, 10 from one another, as shown in FIG. 3. The core 14 is drawn out of the body portion 2 and the surface portion 4. In addition, the handle comprising the body portion 2 and the surface portion 4 thereon are removed from the mould. Thus the handle is complete. According to the exemplary embodiments described above, it should be noted that there may also be two or more surface portions 4 that are set simultaneously in the mould cavity 8 prior to the moulding of the body portion 2. In addition, the surface portion 4 is advantageously smaller and lighter than the body portion 2.

By use of the above method it is possible to manufacture a handle for a hand tool, which comprises a body portion and a surface portion provided thereon. In this connection the handle refers to a handle or a shaft of an axe, a spade, a pair of secateurs, a rake or the like garden tool, or to another handle or shaft of a hand tool. The surface portion 4 may be, for instance, a gripping part intended for the user to grip when the hand tool is in use. Alternatively, the surface portion 4 may also be a coloured layer or the like, by means of which the handle or a part thereof is given a desired colour or colours or other coating layer that covers at least part of the body portion 2. The surface portion 4 is advantageously made of softer material than the body portion 2, but alternatively it is of material that is equal in hardness to the body portion 2 or of even harder material.

It is apparent to a person skilled in the art that as technology advances the basic idea of the invention may be implemented in a variety of ways. Thus, the invention and the embodiments thereof are not restricted to the above examples but they may vary within the scope of the claims.

The invention claimed is:

1. A method for manufacturing a handle for a hand tool, the handle comprising a body portion and one or more surface portions provided at least partly on the body portion, the method comprising:

fabricating a tubular surface portion of the one or more surface portions and setting it in a mold cavity of a mold against a cavity wall;

setting a core into the mold cavity and the tubular surface portion, and casting melt mass into the mold cavity for providing the body portion that constitutes a shaft of an axe, a spade, a pair of secateurs or a rake such that the melt mass flows into the tubular surface portion into a space between the tubular surface portion and the core and the tubular surface portion is pressed against a wall of the mold cavity to obtain a shaft where said tubular surface portion covers at least a part of the body portion to define a gripping part, and drawing out the core from the body portion to form an at least partly hollow body portion to define said shaft.

2. The method of claim 1, wherein the surface portion is smaller and lighter than the body portion.

3. The method of claim 1, wherein the surface portion is a gripping part that is intended for a user to grip when the hand tool is in use.

4. The method of claim 1, wherein the surface portion is set into the mold cavity such that it is unable to move during said casting.

5. The method of claim 4, wherein the surface portion is set at an end of the mold cavity, in a recess provided in the mold cavity for the surface portion, or against a counterpart surface provided in the mold cavity.

6. The method of claim 1, wherein the surface portion is at least partly a sleeve-like part that is made to surround at least partly the body portion in a finished product.

7. The method of claim 1, wherein the surface portion is fabricated by injection molding in a separate surface portion mold.

8. The method of claim 1, wherein the surface portion is provided of a softer material than the body portion.

9. The method of claim 1, wherein the core is set in the mold cavity such that during said casting the melt mass flows between a gripping part and the core.

10. The method of claim 1, wherein the body portion is provided during said casting by injection molding.

11. A handle for a hand tool, the handle comprising a body portion and one or more surface portions provided at least partly on the body portion, wherein the handle is manufactured by the method of claim 1.

12. The handle of claim 11, wherein the surface portion is smaller and lighter than the body portion.

13. The handle of claim 11, wherein the surface portion is a gripping part that is intended for a user to grip when the hand tool is in use.

14. The handle of claim 11, wherein the surface portion is at least partly a sleeve-like part, a planar part or a surface layer.

15. The handle of claim 11, wherein the surface portion is provided of material that is softer than the body portion.

* * * * *